United States Patent
Kendall, Jr. et al.

[11] Patent Number: 5,297,761
[45] Date of Patent: Mar. 29, 1994

[54] MULTI-AXIS G-COMPENSATING ESCAPE COCKPIT CAPSULE

[76] Inventors: Robert T. Kendall, Jr., 1381 Rounds Ave., Grants Pass, Oreg. 97527; Robert T. Kendall, Sr., 752 Via Somonte, Palos Verdes, Calif. 90274

[21] Appl. No.: 898,708

[22] Filed: Jun. 15, 1992

[51] Int. Cl.[5] .............................................. B64D 25/12
[52] U.S. Cl. ..................... 244/140; 244/118.5; 244/122 A; 244/141
[58] Field of Search ........ 244/118.5, 122 A, 122 AD, 244/10 C, 137.2, 140, 141, 144, 162, 158 R, 160

[56] References Cited

U.S. PATENT DOCUMENTS

| | | | |
|---|---|---|---|
| 2,733,027 | 1/1956 | Gero | 244/140 |
| 2,985,413 | 5/1961 | Von Beckh Widmanstetter | 244/140 |
| 2,986,361 | 5/1961 | Codding | 244/140 |
| 3,679,157 | 7/1972 | Roberts et al. | 244/141 |
| 3,881,671 | 5/1975 | Bouchnik | 244/140 |
| 4,261,535 | 4/1981 | Swanson | 244/141 X |
| 4,699,336 | 10/1987 | Diamond | 244/140 |

*Primary Examiner*—Joseph F. Peters, Jr.
*Assistant Examiner*—Christopher P. Ellis
*Attorney, Agent, or Firm*—Robert M. Sperry

[57] ABSTRACT

An improved cockpit area for manned atmospheric or space vehicles includes a generally spherical, multi-axis G-compensating cockpit capsule which houses the crewmen, together with the appropriate operational and navigational instruments and the mechanisms necessary for controlling the vehicle and which is rotatably mounted in the vehicle and is controllable by the crewman to permit the crewman direct visual observation throughout virtually a full circle about the vehicle, without altering the course of the vehicle, together with a device for automatically rotating the capsule to minimize the effect of high G-forces on the crewmen, and an emergency mechanism for ejecting the capsule, with the crewmen therein, and for protecting the crewmen during and after descent and landing of the capsule.

27 Claims, 5 Drawing Sheets

VOLUNTARY TOLERANCE
TO ACCELERATION-
0.02-0.50 SECOND    NOTE: "G" MEASURED RADIALLY

MULTI-AXIS G-COMPENSATING ESCAPE COCKPIT CAPSULE

TECHNICAL FIELD

This invention relates to manned vehicles, such as aircraft, space vehicles and the like and is especially directed to improved cockpits and cockpit capsules for such manned vehicles providing improved visibility, efficiency and safety for crewmen, which may include pilots, navigators, weapons specialists or other onboard personnel, during operation of the vehicle and new tactics that improve crew and aircraft survivability, as well as mission success, greater safety for the crew during and after ejection from the vehicle and improved post-ejection survivability for the crew while descending and impacting on land or water.

BACKGROUND ART

As is well known, manned vehicles are controlled by a crew sitting within a control area, generally referred to as a "cockpit", which contains an instrument panel, housing instrument providing operational and navigational information to the crew, and control mechanisms, which enable the crew to steer and regulate the operation of the vehicle. Unfortunately, the "cockpit" areas of prior art vehicles are inadequate to meet the needs of modern vehicles. Modern manned vehicles, such as jet aircraft, space vehicles and the like, are frequently operated at high subsonic, supersonic and hypersonic velocities and perform maneuvers involving high acceleration or "G-forces". Under these conditions, it is generally beyond human physical capabilities to manually perform such operations as positioning the flight surfaces of the vehicle and operate the vehicle's offensive and defensive systems. In view of this, it is conventional for the control mechanisms, which the crew actuates in the cockpit of the vehicle, to be connected electrically, or in other ways, to suitable servomotors and the like which actually position the flight surfaces of the vehicle and perform such other functions as are called for by the crew for operating and controlling the operation of the vehicle. Similarly, sensors of substantially any desired type may be located throughout the vehicle, as appropriate, and are electrically or otherwise connected to the instrument panel or helmet in the cockpit. Furthermore, both due to the construction of prior art vehicles and as a consequence of operation under the foregoing conditions, the crewmen's peripheral vision often becomes restricted. However, the need to observe other aircraft and potential hazards at all points about the vehicle is obviously of major importance. In prior art "cockpit" areas, radar, television displays and other sensors are often provided as aids to or substitutes for direct vision. Although these "aids" are helpful to some extent, they are severely limited compared to the vast quantity and range of information which the crewman's own senses receive as a result of direct visual observation.

Prior art "cockpit" areas are also inadequate from a survival standpoint. In the event that it becomes necessary to evacuate the vehicle, most prior art vehicles leave the pilot to depend upon manual evacuation or the use of ejection seats. Unfortunately, manual evacuation is frequently impossible, especially under high subsonic, supersonic and hypersonic or high G-force conditions. On the other hand, ejection seats subject the crew to extremely high G-forces in a vertical direction, which often results in spinal compression injuries. Moreover, crewmen are frequently rendered unconscious, lacerated or otherwise injured by encounters with adjacent portions of the vehicle in battle or during the ejection process. Furthermore, with prior art parachute recovery systems, after ejection, the crew may have to be separated from the ejection seat and actuate a parachute to decelerate and control his descent. Unfortunately, prior art ejection seats and their parachute recovery systems provide little or no directional control after initial ejection, protection against windblast, airborne or ground obstacles or hard landings. When impacting on water, with prior art recovery systems, the crewman is immersed in water and must enter predeployed flotation equipment and subsystems are needed to prevent hypothermia. Furthermore, in combat conditions, prior art parachute escape and recovery systems or ejection seats sometimes leave the crewmen helplessly exposed to extreme environmental conditions or hostile small arms fire for considerable periods of time.

A search in the United States Patent Office has revealed U.S. Pat. No. 2,985,413, issued May 23, 1961, to M. J. A. Von Beckh Widmanstetter showing a Multi-Directional anti-G Device which is superficially similar to the present invention. However, the Widmanstetter device is freely rotatable about the pitch axis only and is gravity-actuated, whereas the device of the present invention is moveable about both the pitch axis and the yaw axis and is power-driven. This two-axis rotation allows the capsule to respond to G-forces which are at an angle to the pitch plane of the vehicle and enables pilot to actuate the mechanism, at will, to view otherwise obstructed areas about the vehicle. These features are not possible with the Widmanstetter device.

For these and other reasons, it is apparent that the "cockpit" areas, ejection seats, parachute systems and descent and landing methods of the prior art are inadequate and have many deficiencies which have frequently been the cause of injuries and fatalities, even after successful ejection and descent.

DISCLOSURE OF THE INVENTION

The disadvantages of the prior art are overcome with the present invention and an improved "cockpit" area for manned vehicles is provided which permits the crewmen to have direct visual observation throughout virtually a full circle about his vehicle and, under battle-mode conditions, automatically acts (with manual override option) to minimize the effect on the crewman of high G-force loading, and which protects and shelters the crewmen during flight and in the event of ejection, descent, landing and until recovery.

The advantages of the present invention are preferably attained by providing an improved cockpit area for manned vehicles comprising a generally spherical, multi-axis G-compensating cockpit capsule which houses the crewman, together With the appropriate operational and navigational instruments and the mechanisms necessary for controlling the vehicle and which is rotatably mounted in the vehicle and is controllable by the crewman to permit the crewman direct visual observation throughout virtually a full circle hemisphere above and about the vehicle, together with means for automatically rotating the capsule to minimize the effect of high G-forces on the crewman during flight maneuvers and ejection, and emergency means for ejecting the capsule, with the crewman therein in the "eyes in" direction, which provides twice the G-force compensation of prior art systems, followed by ejection of a positively inflated droque stabilizer, decelerator and attenuator for protecting the crewman during and after descent and landing of the capsule.

Accordingly, it is an object of the present invention to provide an improved cockpit area for manned vehicles, and unmanned emergency escape capsules in spacecraft for later use by space personnel or recovery of orbital or suborbital payloads for evaluation and examination.

Another object of the present invention is to provide means for increasing the area of direct visibility and combat performance in offense and defense throughout this area of direct visibility available to the crewman of a manned vehicle.

An additional object of the present invention is to provide increased safety for the crewmen of a manned vehicle during emergency evacuation from the vehicle, as well as preventing hostile forces from seeing the crewman during descent.

Another objective of the present invention is provision for slaved weapons on turrets which rotate 360° with the crewman as the crewman determines.

another objective of the present invention is reduced exposure of crewmen to environmental, reentry, descent and landing recovery hazards.

An additional objective of the present invention is use of the still-inflated cone-shaped vehicle as a shelter after landing.

A still further objective of the present invention is to us the still-inflated cone-shaped structure as a flotation device preventing immersion, hypothermia and shark threat in the event of a water landing.

Yet another objective of the present invention is to use the still-inflated cone-shaped decelerator as a large visual and radar-reflective image for assisting search and rescue teams.

Still another object of the present invention is to enable the crewman to observe, sight and fire slaved turret or fixed type weapons to meet hostile threats substantially anywhere about the vehicle without altering the course of the vehicle, especially during close air combat, and for use by aircraft on ground targets.

A specific object of the present invention is to provide an improved cockpit area for manned vehicles comprising a generally spherical, multi-axis G-compensating, pressurized cockpit and escape capsule which houses the crewmen, together with the appropriate operational and navigational instruments and the mechanisms necessary for operating and controlling the vehicle and which is rotatably mounted in the vehicle and is controllable by the crewman to permit the crewman direct visual observation and weapons sighting and operational control throughout virtually a full circle and limited spherical surface coverage about the vehicle, together with means for automatically rotating the capsule to minimize the effect of high G-forces on the crewmen, and emergency means for ejecting the capsule, with the crewmen therein, and for protecting the crewmen during descent, landing and recovery.

These and other objects and features of the present invention will be apparent from the following detailed description, taken with reference to the figures of the accompanying drawings.

BEST MODE FOR CARRYING OUT THE INVENTION

Figure 1:
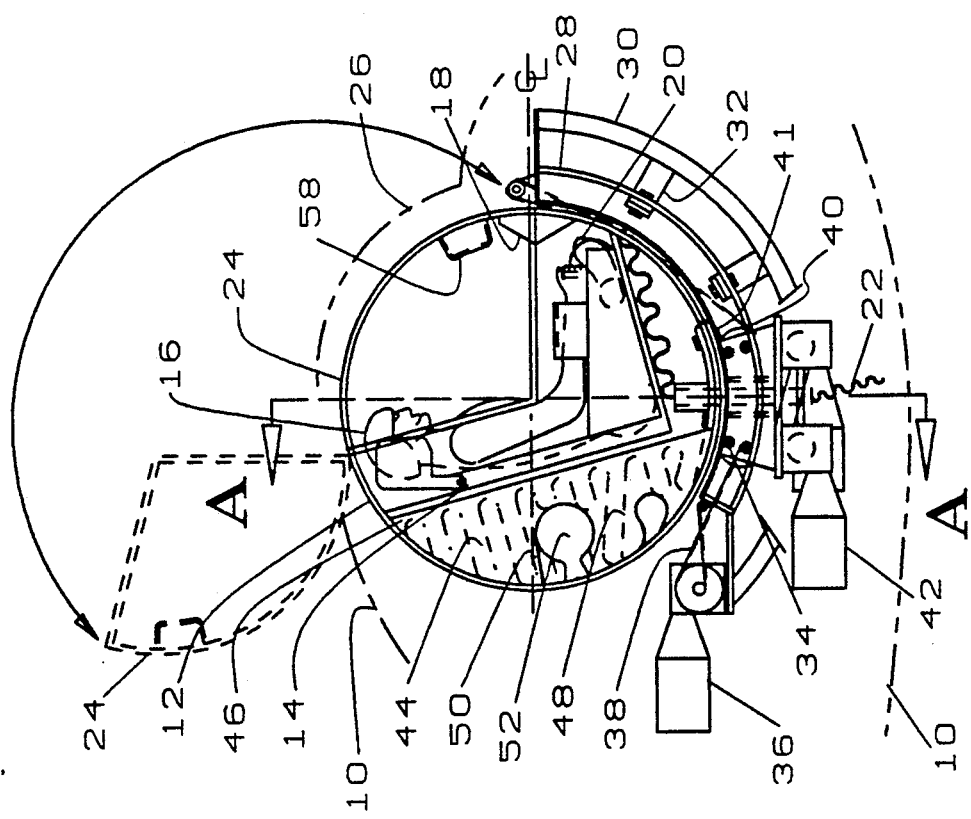
FIG. 1 is a diagrammatic side view showing the control capsule of the present invention installed in a manned vehicle, with the vehicle shown broken away for clarity.

In that form of the present invention chosen for purposes of illustration in the drawing, FIG. 1 shows a manned vehicle, indicated generally at 10, which may be an aircraft, space vehicle, automobile, boat or the like, having a spherical, Multi-Axis, G-compensating Escape cockpit Capsule (MAGEC) 12. The MAGEC pressurized capsule 12 contains a seat 14 for the crewman 16, together with an instrument panel 18 (This may include holographic instruments.) and control means, such as joy stick 20. As indicated above, it is conventional for the control mechanisms, such as joy stick 20, which the pilot 16 actuates in the MAGEC cockpit capsule 12 of the vehicle 10, to be connected electrically or otherwise, as by cable 22, to suitable servomotors and the like, not shown, located within the vehicle 10 external of the MAGEC cockpit capsule 12, which actually position the flight surfaces of the vehicle and perform such other functions as are called for by the crewman 16 for operating and controlling the operation of the vehicle 10. Similarly, suitable sensors and other information gathering devices, not shown, are located at appropriate locations throughout the vehicle 10, external of the MAGEC cockpit capsule 12, and are electrically or otherwise connected, as by cable 22, to supply information to the instrument panel 18 to make the information available to the crewman 16 located within the MAGEC cockpit capsule 12. Cable 22, or similar mechanism, is releasably connected to the MAGEC cockpit capsule 12 through pedestal trunnion 40. The crewman 16 enters and leaves the MAGEC cockpit capsule 12 by means of a door 24, shown in dotted lines in the open position, which is formed of transparent material and which, when closed, as seen in solid lines, serves as a window for the MAGEC cockpit capsule 12.

Figure 2:
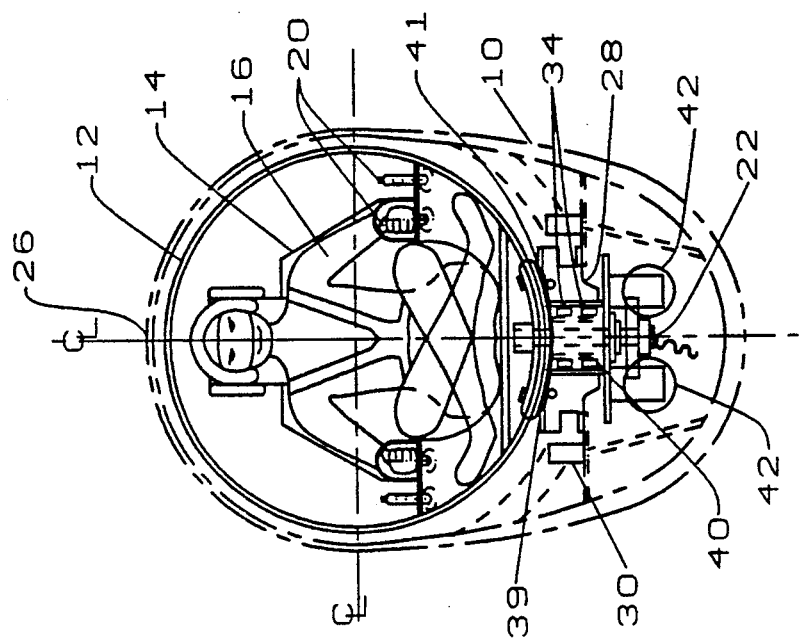
FIG. 2 is a transverse section of the capsule of FIG. 1, taken on the line A—A of FIG. 1.
Figure 10:
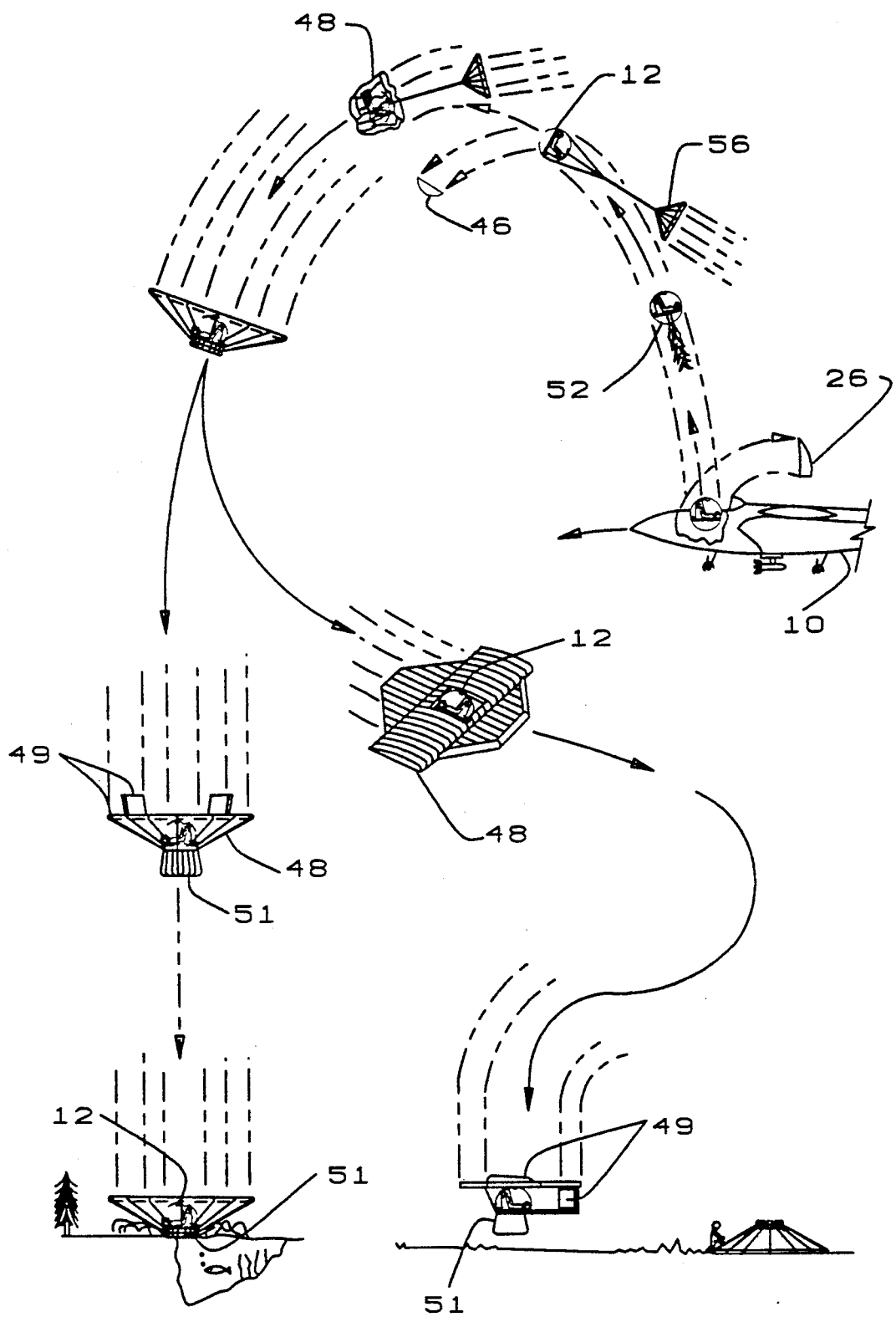
FIG. 10 is a diagrammatic representation showing the control capsule of FIG. 1 during descent following ejection from the vehicle.

The remainder of the capsule cockpit 12 is preferably formed of more substantial material. As shown, a transparent canopy 26 may or may not be necessary and, if provided, serves to close and to streamline the top of the vehicle 10 above the MAGEC cockpit capsule 12. The MAGEC cockpit capsule 12 has arcuate shuttle rails 28 mounted on the bottom of the capsule 12, which are supported by a shuttle support structure 30, which is mounted on the frame, not shown, of the vehicle 10, and has a plurality of pillars 32 projecting from the support structure 30 carrying rollers 34 to facilitate movement within the shuttle rails 28. A shuttle drive motor 36 is mounted adjacent one end of the support structure 30 and drives a cable 38, or other suitable means, which is connected to pedestal 40 to tilt the MAGEC cockpit capsule 12 through an arc of approximately 90° about the pitch axis of the vehicle 10. As best seen in FIGS. 1 and 2, the MAGEC cockpit capsule 12 is releasably mounted, as by explosive bolts 41 (and a guillotine cutter, not shown, to sever cable 22), on the pedestal base 39 which projects downwardly between the shuttle rails 28 and the shuttle cable 38 is connected to the pedestal trunnion 40. Also, the pedestal trunnion 40 carries suitable mechanism 42 for rotating the MAGEC cockpit capsule 12 approximately 135° to either side of the centerline of the vehicle 10. Behind the pilot's seat 14 is a compartment 44, having an ejectable cover 46, for stowing a recovery device 48, such as the device known as the "Kendall Cone", described in U.S. Pat. No. 4,832,288, issued May 23, 1989 to Robert T. Kendall et al and assigned to the present assignee. If desired, the recovery device 48 may include inflatable control surfaces, as seen at 49 in FIG. 10, and an inflatable landing cushion 51 is carried in the capsule 12 and may be deployed, manually or automatically, prior to impact, as seen in FIG. 10, to cushion the landing impact. Also, within the compartment 44 is a rearwardly facing compartment 50, housing a suitable ejection motor 52.

Figures 3, 4, 5:
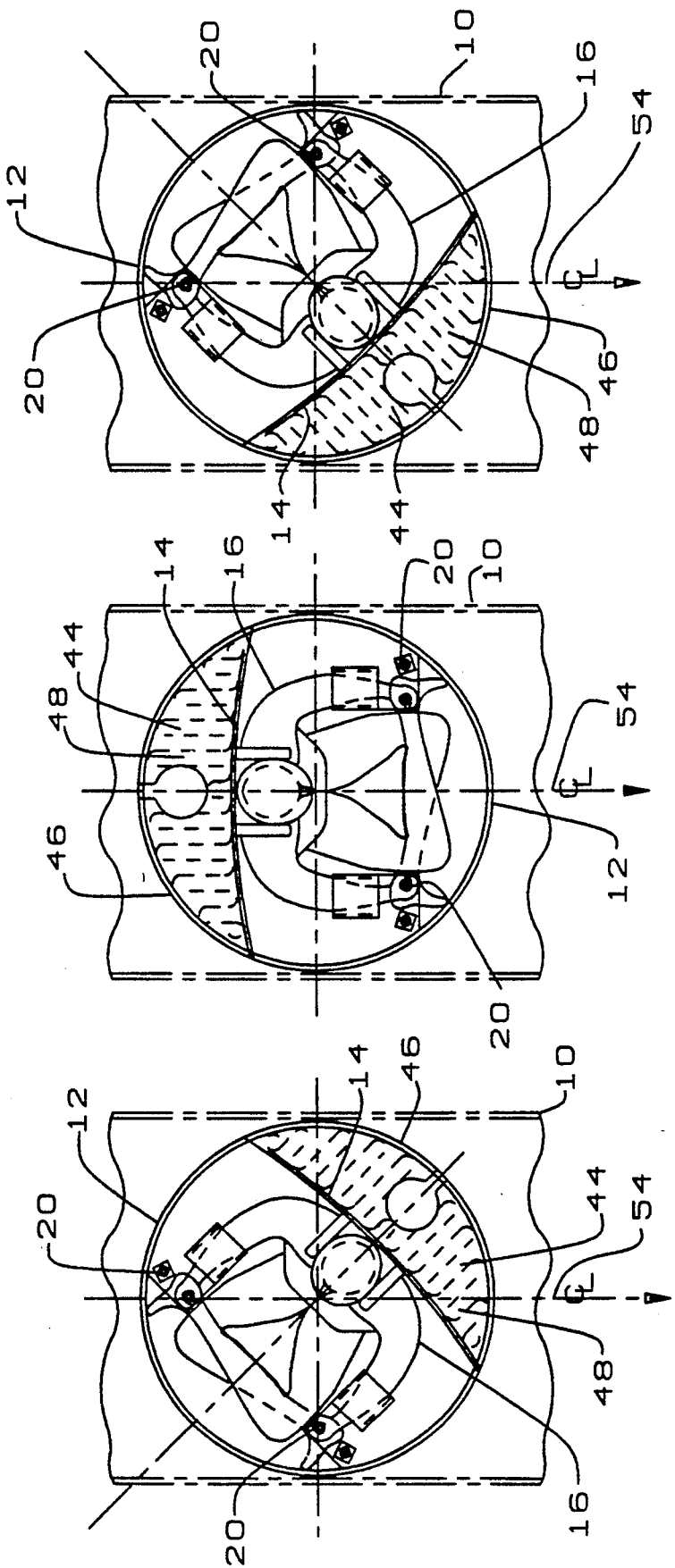
FIG. 3 is a top view of the capsule of FIG. 1, shown in the normal orientation with the pilot looking forward in line with the vehicle centerline.
FIG. 4 is a view, similar to that of FIG. 3, showing the control capsule of FIG. 1 rotated 135° to the right of the vehicle centerline.
FIG. 5 is a view, similar to that of FIG. 3, showing the control capsule of FIG. 1 rotated 135° to the left of the vehicle centerline.
Figure 7:
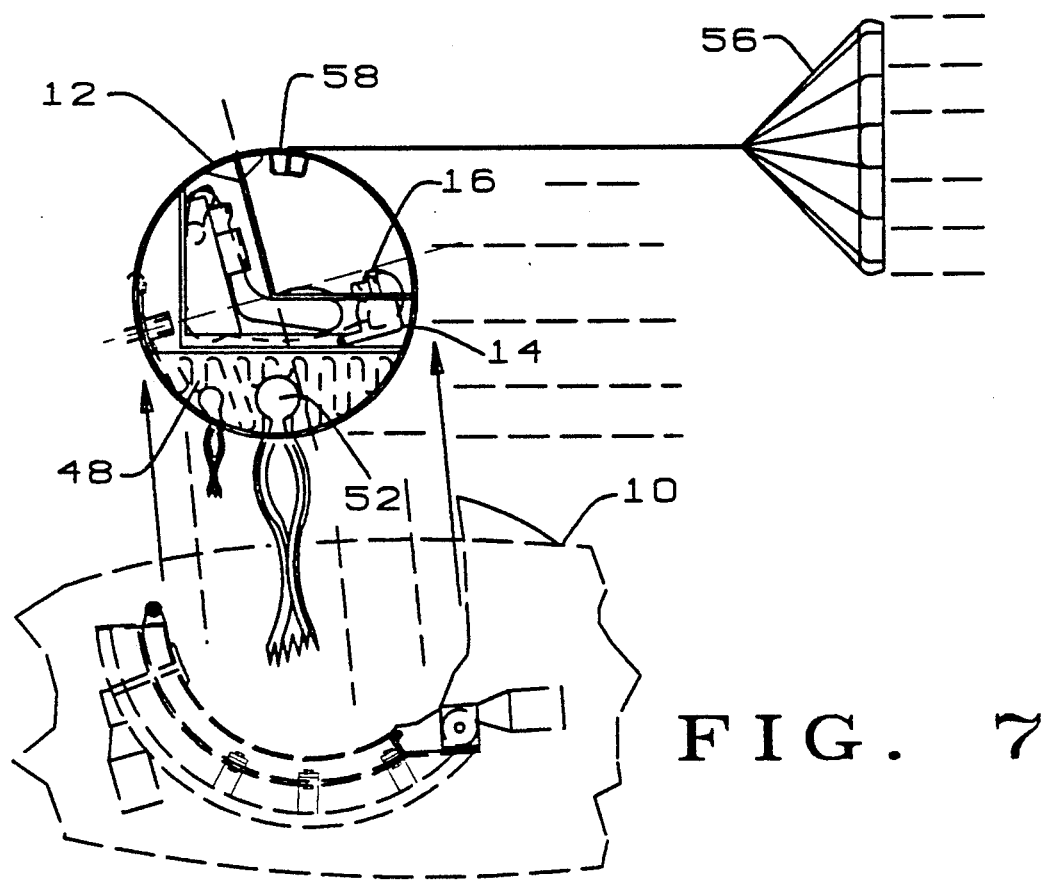
FIG. 7 is a view, similar to that of FIG. 6, showing the control capsule of FIG. 1 immediately following ejection from the vehicle.
Figure 9:
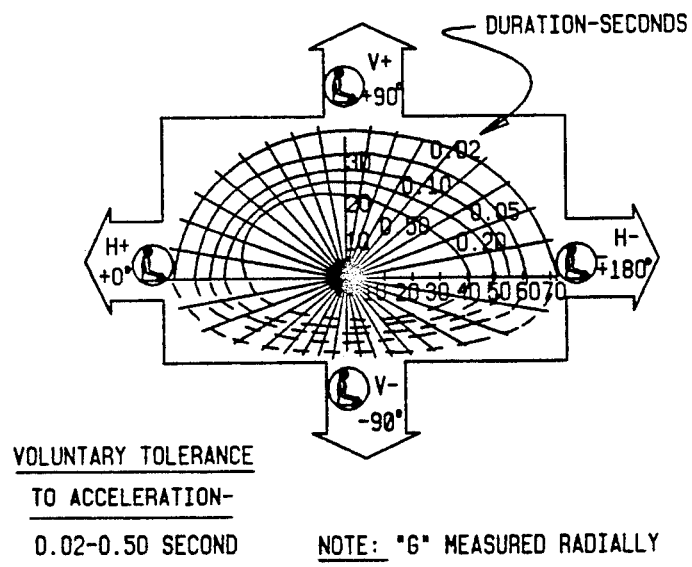
FIG. 9 is a diagrammatic representation showing the tolerance of the human body to acceleration in respective directions.

In use, the MAGEC cockpit capsule 12 is normally in the position seen in FIGS. 1 and 2, with the crewman 16 sitting in a substantially vertical position facing forward along the centerline 54 of the vehicle 10, as seen in FIG. 3. However, when necessary or desirable, the rotating mechanism 42 of the MAGEC cockpit capsule 12 can be actuated, automatically in response to high "G" forces or manually through the control mechanism 20, to rotate the MAGEC cockpit capsule 12 to either side of the centerline 54 through angles of up to about 180°, as seen in FIGS. 4 and 5. This rotating action can be accomplished by the crewman 16, when desired, to provide the crewman 16 to observe and operate the vehicle directly through an entire 360° circle about the vehicle 10. Also, if desired, the crewman 16 can use the control mechanism 20 or other means to actuate the shuttle drive motor 36 to control tilting of the MAGEC cockpit capsule 12 forward or rearwardly throuqh approximately 90°. The rotating and tilting actions may also be accomplished automatically in response to signals from an accelerometer or "G-sensor", not shown, located within the vehicle 10 to protect the crewman 16 from blackout or injury due to high-G maneuvers. As seen in FIG. 9, it is well known that the human body can best withstand acceleration forces when they are carried by a large surface area, such as the back surface of the body. This position is sometimes referred to as the "eyes-in" position. Causing the MAGEC cockpit capsule 12 to revolve in response to the performance "G" forces on the vehicle 10 assures that, whenever high G-forces are encountered, the crewman 16 will be placed in the most favorable position for withstanding these forces with minimum physiological effect and, hence, more effectively controlling the vehicle 10 during and after the high-G maneuver has been completed.

Figure 6:
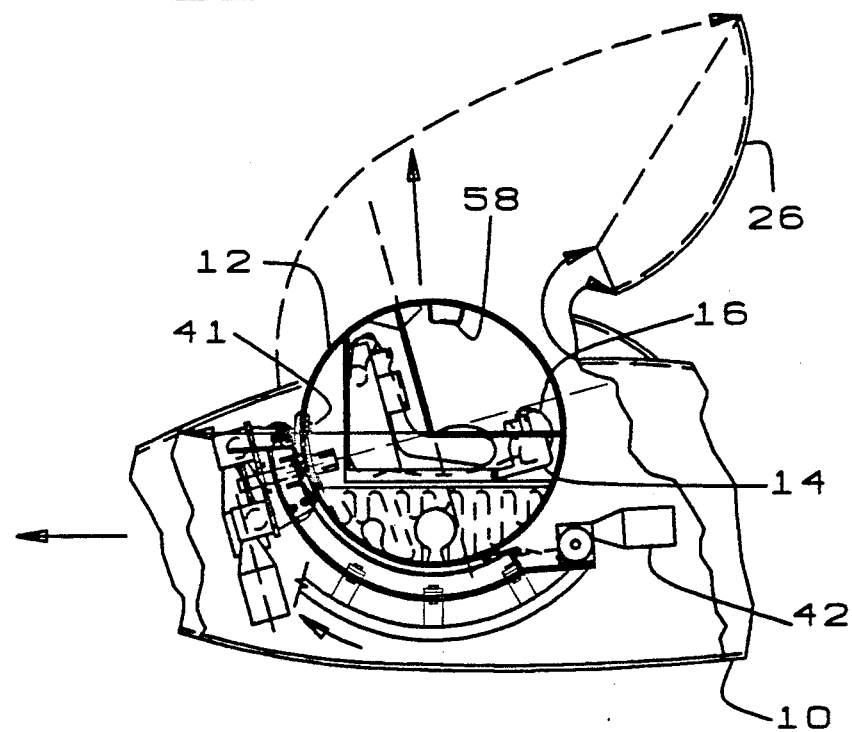
FIG. 6 is a side view of the control capsule of FIG. 1 rotated to its ejection position.
Figure 8:
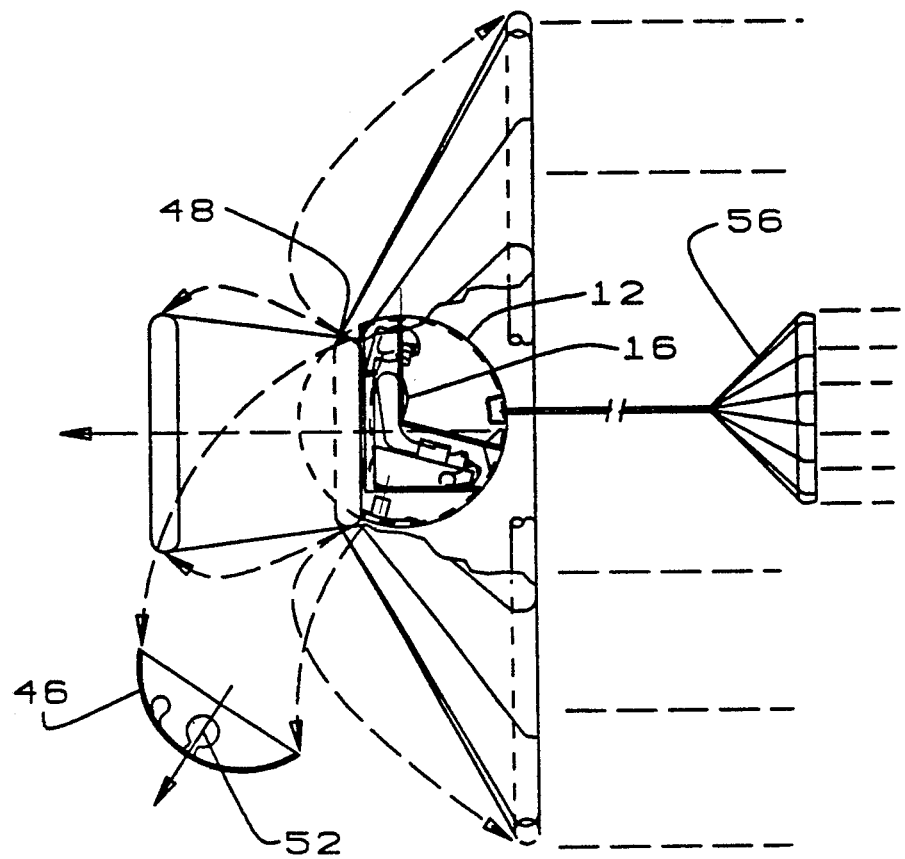
FIG. 8 is a view, similar to that of FIG. 6, showing the control capsule of FIG. 1 deploying its recovery means.

In the event that it becomes necessary or desirable to evacuate the vehicle 10, whether at high speed in the air, during take-off or landing or prior to take-off, the crewman 16 initiates the escape system which automatically rotates and may tilt the MAGEC cockpit capsule 12 to the position seen in FIG. 6, which places the crewman 16 in the "eyes-in" position for ejection. The crewman 16 initiates the escape actuator, not shown, which begins the ejection sequence that automatically ejects the canopy 26 to separate the MAGEC cockpit capsule 12 from the vehicle 10 and initiates and fires the ejection motor 52 to eject the MAGEC cockpit capsule 12, containing the crewman 16, out of the vehicle 10, as seen in FIG. 8. If the crewman is injured or unconscious, the canopy 26 and MAGEC cockpit capsule 12 are automatically ejected in response to appropriate signals from attitude instruments or the like. Preferably, an inflatable stabilizing droque 56 is housed in and deployed from an external compartment 58 in the front portion of the MAGEC cockpit capsule 12 and, upon firing of the ejection motor 52, the droque 56 is released into the airstream and inflated to rotate the MAGEC cockpit capsule 12 to the position seen in FIG. 8, which places the crewman 16 in the "eyes-in" position to withstand the shock of deployment of the main recovery device 48. While the MAGEC cockpit capsule 12 is rotating to the position of FIG. 9, the ejectable cover 46 is released, which releases the main "Kendall-Cone" recovery device 48 and activates the inflation pressurizing system to deploy and shape the recovery device 48, as best seen in FIG. 10. Once the main recovery device 48 has been deployed, it envelopes and protects the MAGEC cockpit capsule 12, containing the crewman 16, and glides the MAGEC cockpit capsule 12 to a safe landing, as seen in FIG. 10. Alternatively, if desired, the Inflate-A-Glider recovery system may be provided to allow the crewman to control lateral movement of the MAGEC cockpit capsule 12 during descent and, even, to significantly increase the lateral range of the MAGEC cockpit capsule 12, as described in the aforementioned copending patent application. Because the crewman 16 is totally contained within the MAGEC cockpit capsule 12, he will not be visible to opposing troops and this fact, together with the structure of the MAGEC cockpit capsule 12 will protect the crewman 16 from exposure to hostile environmental conditions and from injury due to hostile small arms fire and from land mines or encounters with hard objects, during the ground impact, or immersion, hyperthermia, injury, shark attack or drowning, in the event of a water landing, since the still-inflated structure of the "Kendall-Cone" 48 serves as a life boat and provides a large visual and radar-reflective surface to assist search and rescue teams. It will be apparent that conventional parachutes or other suitable recovery means could be substituted for the recovery device 48. However, the advantages of the "Kendall Cone" or "Inflate-A-Glider", noted above, are substantial and are described more fully in the patent and application covering these devices.

Obviously, numerous variations and modifications can be made without departing from the present invention. Therefore, it should be clearly understood that the form of the present invention described above and shown in the figures of the accompanying drawings are illustrative only and are not intended to limit the scope of the present invention.

What is claimed is:

1. A manned vehicle comprising:
   a control cockpit capsule mounted within said vehicle containing an instrument panel and control means and having means for allowing ingress and egress by a crewman,
   sensor means located within said vehicle and connected to supply data to said instrument panel,
   means for operating said vehicle connected to said control means in said capsule to enable said crewman to operate and control said vehicle; and
   motorized means mounted in said vehicle for rotating said capsule within said vehicle to maintain said crewman in an "eyes-in" position; said "eyes-in" position being the position where the crewman can best withstand acceleration forces.

2. The vehicle of claim 1 wherein:
   said control capsule is releasably mounted in said vehicle.

3. The vehicle of claim 1 wherein:
   said rotating means comprises a motor for tilting said control capsule through an arc of up to about 90° about an axis transverse to the centerline of said vehicle.

4. The vehicle of claim 1 wherein:
   said rotating means comprises a motor for rotating said control capsule to either side of the centerline of said vehicle.

5. The vehicle of claim 4 wherein;
   said rotating means can rotate said capsule approximately 180° to either side of said centerline.

6. The vehicle of claim 3 wherein:
   said tilting means is operable by said crewman through said control means.

7. The vehicle of claim 4 wherein:
   said rotating means is operable by said crewman through said control means.

8. The vehicle of claim 3 wherein:
   said tilting means is operable automatically in response to signals from said sensor means.

9. The vehicle of claim 4 wherein:
   said rotating means is operable automatically in response to signals from said sensor means.

10. The vehicle of claim 1 further comprising:
    means for tilting said control capsule through an arc of up to about 90° about the pitch axis of said vehicle, and
    means for rotating said control capsule to either side of the centerline of said vehicle.

11. The vehicle of claim 10 wherein:
    said tilting means and said rotating means are operable by said crewman through said control means.

12. The vehicle of claim 10 wherein:
    said tilting means and said rotating means are operable automatically in response to signals from said sensor means.

13. The vehicle of claim 1 further comprising:
    said control capsule contains at least one seat for a crewman and has a compartment for stowing and deploying a recovery device for controlling the descent and landing of said capsule and said crewman.

14. The vehicle of claim 13 further comprising:
    an ejection motor mounted in said compartment and actuable by said crewman to eject said control capsule from said vehicle.

15. The vehicle of claim 14 further comprising:
    means in said control capsule responsive to actuation of said ejection motor for rotating said capsule prior to deployment of said recovery means to place said crewman in a position such that the force of dedeployment of said recovery means will be distributed over the back surface of said crewman.

16. The vehicle of claim 3 wherein:
    said tilting serves to move said crewman to the "eyes-in" position.

17. The vehicle of claim 4 wherein:
    said rotation serves to move said crewman to the "eyes-in" position.

18. The vehicle of claim 10 wherein:
    said tilting and rotating serve to move said crewman to the "eyes-in" position.

19. The vehicle of claim 13 further comprising:
    at least one orientation motor mounted in said capsule and actuable by said crewman to control the orientation of said capsule.

20. The vehicle of claim 1 further comprising:
    an inflatable landing cushion carried within said capsule and deployable prior to landing to cushion the landing impact after ejection from said vehicle.

21. The vehicle of claim 1 further comprising:
    inflatable deceleration means carried within said capsule and deployable following ejection from said vehicle to control descent and landing of said capsule.

22. The vehicle of claim 21 wherein:
    said deceleration means remains inflated following landing and serves to provide a large visual and radar-reflective image to assist search and rescue teams.

23. The vehicle of claim 21 further comprising:
    inflatable control surfaces carried by said deceleration means to allow said crewman to control the lateral movement of said capsule during descent after ejection from said vehicle.

24. The vehicle of claim 21 wherein:
    said deceleration means serves as a life boat for said crewman in the event of a water landing.

25. The vehicle of claim 21 wherein:
    said deceleration means envelopes said capsule and serves to prevent observation and damage of said capsule and injury to said crewman by hostile forces during descent and landing after ejection from said vehicle.

26. The vehicle of claim 21 wherein:
    said deceleration means serves to protect said crewman from immersion, hyperthermia, shark attack and drowning in the event of a water landing after ejection from said vehicle.

27. The vehicle of claim 1 wherein:
    said capsule provides protection from hostile environmental conditions outside said capsule.

* * * * *